United States Patent [19]

Ely et al.

[11] 3,898,165

[45] Aug. 5, 1975

[54] COMPOSITIONS FOR FRACTURING HIGH TEMPERATURE WELL FORMATIONS

[75] Inventors: John W. Ely; Jiten Chatterji; Marlin D. Holtmyer; John M. Tinsley, all of Duncan, Okla.

[73] Assignee: Halliburton Company, Duncan, Okla.

[22] Filed: June 11, 1973

[21] Appl. No.: 368,777

Related U.S. Application Data

[60] Division of Ser. No. 245,278, April 18, 1972, Pat. No. 3,768,566, which is a continuation-in-part of Ser. No. 90,301, Nov. 17, 1970, abandoned.

[52] U.S. Cl............. 252/8.55 R; 106/201; 106/203; 106/207; 106/208; 166/283; 166/308; 252/316; 260/15; 260/17.3; 260/17.4 ST; 260/29.4 R
[51] Int. Cl.$^2$... E21B 43/26; C08L 1/26; C08L 5/00
[58] Field of Search ........... 166/308, 283, 281, 280; 252/8.55 R, 8.55 C; 106/208, 207, 203; 260/17.4 ST, 17.4 R, 29.6 ME, 232, 17.3

[56] References Cited
UNITED STATES PATENTS

| | | | |
|---|---|---|---|
| 3,049,537 | 8/1962 | Klug.................................... | 260/232 |
| 3,347,847 | 10/1967 | Engelskirchen et al. ........... | 260/232 |
| 3,475,334 | 10/1969 | Boudreaux........................ | 252/8.55 |
| 3,634,237 | 1/1972 | Crenshaw et al. ................ | 252/8.55 |
| 3,696,035 | 10/1972 | Nimerick........................... | 252/8.55 |
| 3,779,914 | 12/1973 | Nimerick........................... | 252/8.55 |

*Primary Examiner*—Herbert B. Guynn
*Attorney, Agent, or Firm*—Thomas R. Weaver; Fred E. Hook; John H. Tregoning

[57] ABSTRACT

This invention provides a fracturing fluid having a high viscosity at temperatures above 200°F comprising an aqueous fluid having a pH of less than 7, a water soluble alcohol and a crosslinked polysaccharide.

15 Claims, No Drawings

COMPOSITIONS FOR FRACTURING HIGH TEMPERATURE WELL FORMATIONS

This is a division of application Ser. No. 245,278, filed Apr. 18, 1972, and now U.S. Pat. No. 3,768,566, reissued Oct. 30, 1973, which is a continuation-in-part of application Ser. No. 90,301, filed Nov. 17, 1970, and now abandoned.

Hydraulic fracturing is a widely used method for stimulating petroleum producing subterranean formations and is commonly performed by contacting a subterranean formation with a viscous fracturing fluid having particulated solids, hereinafter referred to as propping agents, suspended therein, applying sufficient pressure to the fracturing fluid to open a fracture in the subterranean formation and maintaining this pressure while injecting the fracturing fluid into the fracture at a sufficient rate to extend the fracture into the subterranean formation. When the pressure on the fracturing fluid is reduced, the propping agent prevents the complete closure of the fracture.

Viscous liquids are desirably used as fracturing fluids because they have been found to remain in the fracture long enough to permit buildup and maintenance of sufficient pressure to open a fracture. Additionally, a viscous fracturing fluid can support propping agents suspended therein.

In order to fracture subterranean formations with temperatures as high as 200°, 300°, 400°F or higher, the fracturing fluid should desirably have as high a viscosity as a fracturing fluid used for fracturing formations with lower temperatures. However, viscous fracturing fluids prepared from hydratable polysaccharides and hydratable polyacrylamides lose a large portion of their viscosity on heating to 200°F and a majority of their viscosity on heating to 400°F.

A viscous fracturing fluid for fracturing a 300°F or 400°F subterranean formation would necessitate preparing a very viscous fracturing fluid at the surface in order to have viscosity when the fracturing fluid contacts the formation. This approach to designing viscous fracturing fluids is limited by the resistance to flow of a highly viscous fracturing fluid through the surface handling equipment and the piping in the upper portion of the bore hole.

The present invention provides a method whereby the viscosity of a fluid is increased at a time when the fluid is being subjected to temperatures which tend to reduce the initial viscosity of the fluid. The viscosity is increased by the hydration of an additive which is a polysaccharide that has been crosslinked such that the polysaccharide's hydration rate is greatly retarded at temperatures below about 100°F. However, the bonds between the crosslinking agent and polysaccharide are temperature sensitive and break at temperatures above about 140°F, thereby enabling the aqueous fluid to hydrate the polysaccharide.

More specifically, the viscosity increasing additive, hereinafter referred to as the retarded gelling agent, of this invention is a hydratable polysaccharide crosslinked with a compound selected from the group consisting of dialdehydes having the general formula:

$$OHC (CH_2)_n CHO, \qquad (1)$$

wherein

$n$ is an integer within the range of 0 to about 3; 2-hydroxyadipaldehyde; dimethylol urea; water soluble urea formaldehyde resins; water soluble melamine formaldehyde resins; and mixtures thereof.

The preferred crosslinking agents for forming the retarded gelling agent of this invention are dialdehydes having the general formula:

$$OHC (CH_2)_n CHO \qquad (2)$$

wherein $n$ is an integer within the range of 1 to about 3.

Examples of dialdehydes within the above general formula are glyoxal, malonic dialdehyde, succinic dialdehyde and glutardialdehyde.

The polysaccharides useful for forming the retarded gelling agent of this invention are hydratable polysaccharides having a molecular weight of at least about 100,000 and preferably within the range of about 200,000 to about 3,000,000. Suitable hydratable polysaccharides are hydratable galactomannan gums, hydratable glucomannan gums, hydratable cellulose derivatives and mixtures thereof. Examples of suitable hydratable polysaccharides are guar gum, locust bean gum, karaya gum, carboxymethylcellulose, carboxymethylhydroxyethylcellulose and hydroxyethylcellulose.

The preferred gelling agent is hydroxyethylcellulose having an ethylene oxide substitution within the range of about 1 to about 10 moles of ethylene oxide per anhydroglucose unit. The most preferred gelling agent is hydroxyethylcellulose having an ethylene oxide substitution within the range of about 1.3 to about 3 moles of ethylene oxide per anhydroglucose unit.

The concentration of crosslinking agent utilized in the production of the retarded gelling agent, the pH of the aqueous fluid and temperature determines the speed at which the bonds between the crosslinking agent and hydratable polysaccharide will be broken to thereby enable the aqueous fluid to hydrate the hydratable polysaccharide.

The concentration of crosslinking agent necessary to render the hydratable polysaccharides of this invention insoluble in an aqueous fluid having a pH of less than about 7 and a temperature of less than about 100°F is within the range of about 0.05 to about 100 parts by weight crosslinking agent and preferably within the range of about 0.1 to about 2 parts by weight crosslinking agent per 100 parts by weight polysaccharide. Crosslinking agent concentrations of less than about 0.05 parts by weight crosslinking agent per 100 parts by weight polysaccharide do not provide sufficient crosslinking to prevent the polysaccharide from hydrating within a short time after being contacted with an aqueous fluid. Crosslinking agent concentrations of greater than about 100 parts by weight crosslinking agent per 100 parts by weight polysaccharide form crosslinked compounds which are too slow to hydrate to be useful in the present invention.

The hydration rate of the retarded gelling agent is controlled by adjusting the pH of the aqueous fluid. The retarded gelling agent of this invention does not hydrate for extended periods in aqueous fluid having a pH of less than about 7 and preferably within the range of about 3 to about 4. However, as the temperature of the aqueous fluid approaches about 140°F the crosslinking bonds are rapidly broken and the gelling agent becomes hydratable.

The retarded gelling agent of this invention is useful for increasing the viscosity of any aqueous fracturing fluid. However, a fracturing fluid designed to utilize the retarded gelling properties of the retarded gelling agent of this invention has a pH of less than 7, and contains a gelling agent, water soluble alcohol and an encapsulated base.

The pH can be adjusted with any water soluble acid; however, acids such as fumaric acid and sodium dihydrogen phosphate are preferred because of their buffering qualities.

The pH of the aqueous fluid is also a factor as the fracturing fluid is heated to temperatures above about 300°F. At temperatures above 300°F the acid in combination with the high temperature rapidly degrades the gelling agent and reduces the viscosity of the fracturing fluid. However, by releasing a base into the fracturing fluid at about 300°F the degrading effect of acid can be eliminated.

The base must be one which can be added to the fracturing fluid at the time of mixing and which will allow the pH of the aqueous fluid to remain below pH 7 until the retarded gelling agent has combined with the aqueous fluid to increase the viscosity thereof. However, as soon as the elevated temperature has broken the polysaccharide-crosslinking agent bond, the pH may be altered. A suitable base, therefore, is one which has been encapsulated in a material which will release the base into the fracturing fluid at temperatures above about 150°F. Suitable bases are any water soluble chemicals having a pH greater than pH 7. Suitable encapsulating materials are waxes which melt at temperatures above about 150°F, hydratable methylcellulose and mixtures thereof.

The gelling agents useful in the present invention are hydratable polysaccharides as previously described and hydratable polyacrylamides having a molecular weight of at least about 30,000. Molecular weights below about 30,000 for polyacrylamides and 100,000 for polysaccharides will generally increase the viscosity of an aqueous fluid, but the higher molecular weights are more efficient on a per pound basis and are preferred.

It has been found that when the hydrated gelling agents of this invention are mixed with an aqueous fluid containing a small amount of water soluble alcohol, the fracturing fluid can better withstand the viscosity reducing effect of temperature. Suitable alcohols are represented by the general formula:

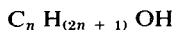

$$C_n H_{(2n+1)} OH \qquad (3)$$

wherein n is an integer within the range of 1 to about 5 and preferably within the range of 1 to about 4.

Examples of alcohols within this formula are methanol, ethanol, n-propanol, isopropanol, n-butanol, isobutanol, sec-butanol, tert-butanol, n-pentanol, 2-methyl-1-butanol, 3-methyl-1-butanol, 2-methyl-2-butanol, 3-methyl-2-butanol, 1-methyl-1-butanol and 1-ethyl-1-propanol.

The most preferred alcohols are represented by the following general formula:

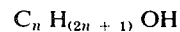

$$C_n H_{(2n+1)} OH \qquad (4)$$

wherein n is an integer within the range of 1 to about 3.

Examples of the most preferred alcohols as represented by this formula are methanol, ethanol, n-propanol and isopropanol.

In a preferred aspect, a fracturing fluid containing the retarded gelling agent of this invention is comprised of water having a pH of less than 7 and the retarded gelling agent of this invention. The pH is preferably adjusted by homogeneously mixing within the concentration range of 3 to about 20 pounds of a weak acid, such as sodium dihydrogen phosphate, per 1,000 gallons of water. The fracturing fluid preferably contains within the range of about 10 to about 300 pounds of the retarded gelling agent per 1,000 gallons of water.

In addition to the retarded gelling agent, the fracturing fluid preferably contains within the range of 10 to 300 and preferably within the range of 20 to 100 pounds of the gelling agent, as previously described, per 1,000 gallons of water.

Fracturing fluids for use at temperatures above about 200°F preferably contain a water soluble alcohol, as previously described, within the concentration range of about 1 to about 10 and preferably within the range of about 2 to about 7 parts by volume alcohol per 100 parts by volume of the water.

Fracturing fluids for use at temperatures above about 300°F preferably contain a base, such as sodium bicarbonate coated with a paraffin having a melting point within the range of about 150°F to about 300°F, within the concentration range of about 5 to about 50 pounds of base per 1,000 gallons of water.

A fracturing fluid of this invention can also contain fluid loss control additives, surfactants, propping agents, clay control chemicals, and concentrations of salt which are compatible with the gelling agent.

The examples are given primarily for the purpose of illustration; and the invention, in its broader aspects, is not to be construed as limited thereto.

DATA

Unless otherwise indicated, hydroxyethylcellulose will refer to hydroxyethylcellulose having an ethylene oxide substitution of about 1.5 moles of ethylene oxide per anhydroglucose unit.

Crosslinked hydroxyethylcellulose refers to hydroxyethylcellulose having an ethylene oxide substitution of about 1.5 moles of ethylene oxide per anhydroglucose unit and being crosslinked with about 0.8 parts by weight glyoxal per 100 parts by weight hydroxyethylcellulose.

EXAMPLE I

The effect of temperature on the viscosity of a fracturing fluid containing a combination of crosslinked hydroxyethylcellulose and hydroxyethylcellulose is compared to the viscosity of a fracturing fluid containing crosslinked hydroxyethylcellulose and a fracturing fluid containing hydroxyethylcellulose by first homogeneously mixing the indicated components with water and heating the resulting fluid from 80° to 500°F in a Fann Model 50 Viscometer while taking the 300 RPM dial reading, using a No. 1 spring and sleeve, at the temperature indicated on Table I. This reading is reported on Table I as the apparent viscosity of the fracturing fluid in centipoise (cp). Samples A, B and C contain 5 parts by volume methanol per 100 parts by volume of water, 10 pounds of sodium bicarbonate coated with paraffin per 1,000 gallons of water and 10 pounds of sodium dihydrogen phosphate per 1,000 gallons of water.

Additionally, Sample A contains 60 pounds of hydroxyethylcellulose and 60 pounds of crosslinked hydroxyethylcellulose per 1,000 gallons of water, Sample B contains 60 pounds of hydroxyethylcellulose per 1,000 gallons of water and Sample C contains 60 pounds of crosslinked hydroxyethylcellulose per 1,000 gallons of water.

TABLE I

| Sample | Viscosity (cp) | | | | | | | | |
|---|---|---|---|---|---|---|---|---|---|
| | 100°F | 150°F | 200°F | 250°F | 300°F | 350°F | 400°F | 450°F | 500°F |
| A | 90 | 230 | 170 | 130 | 80 | 35 | 12 | 3 | 0 |
| B | 75 | 38 | 20 | 10 | 5 | 3 | 1 | 0 | 0 |
| C | 2 | 2 | 2 | 28 | 22 | 5 | 3 | 0 | 0 |

This series of tests illustrate the viscosity characteristics of the retarded gelling agent of this invention.

EXAMPLE II

The effect of temperature on the viscosity of fracturing fluids containing various crosslinked polysaccharides is determined by first homogeneously mixing the indicated components with water, and heating the resulting fluid from 80° to 500°F in a Fann Model 50 Viscometer while taking the 300 RPM dial reading, using a No. 1 spring and sleeve, at the temperature indicated on Table II. This reading is reported on Table II as the apparent viscosity of the fracturing fluid in centipoise (cp).

Samples A through D contain 60 pounds of hydroxyethylcellulose per 1,000 gallons of water, 5 parts by volume methanol per 100 parts by weight of water and sufficient sodium dihydrogen phosphate to adjust the pH of the water to about 5.5.

Additionally, Sample A contains 60 pounds of hydroxyethylcellulose per 1,000 gallons of water, Sample B contains 60 pounds per 1,000 gallons of water of hydroxyethylcellulose crosslinked with about 10 parts by weight glutardialdehyde per 100 parts by weight hydroxyethylcellulose, Sample C contains 60 pounds per 1,000 gallons of water of guar gum crosslinked with about 20 parts by weight glyoxal per 100 parts by weight hydroxyethylcellulose, and Sample D contains 60 pounds per 1,000 gallons of water of hydroxyethylcellulose crosslinked with about 0.8 parts by weight glyoxal per 100 parts by weight hydroxyethylcellulose.

charide as compared to the high initial viscosity of an unretarded polysaccharide. This series also illustrates the temperature stability of a variety of crosslinked polysaccharides.

EXAMPLE III

The temperature stability of various gelling agents are compared by first homogeneously mixing the indicated components with water, heating the resulting fluid to 250°F in a Fann Model 50 Viscometer and maintaining the fluid at 250°F for the time indicated on Tables III and IV before taking the 300 RPM dial reading, using a No. 1 spring and sleeve. This reading is reported on Tables III and IV as the apparent viscosity of the fluid in centipoise (cp).

Sample A contains 90 pounds of hydroxyethylcellulose having an ethylene oxide substitution of about 1.5 moles of ethylene oxide per anhydroglucose unit per 1,000 gallons of water and 1 part by weight potassium chloride per 100 parts by weight of water.

Sample B contains 90 pounds of hydroxyethylcellulose having an ethylene oxide substitution of about 1.8 moles of ethylene oxide per anhydroglucose unit per 1,000 gallons of water and 1 part by weight potassium chloride per 100 parts by weight water.

Sample C contains 90 pounds of hydroxyethylcellulose having an ethylene oxide substitution of about 2.5 moles of ethylene oxide per anhydroglucose unit per 1,000 gallons of water and 1 part by weight potassium chloride per 100 parts by weight of water.

Sample D contains 90 pounds of carboxymethylhydroxyethylcellulose having an ethylene oxide substitution of about 1.5 moles of ethylene oxide per anhydroglucose unit and a carboxymethyl substitution of about 0.2 moles of carboxymethyl anhydroglucose unit per 1,000 gallons of water and 1 part by weight potassium chloride per 100 parts by weight water.

Sample E contains 90 pounds of a copolymer of acrylamide and vinyl chloride per 1,000 gallons of water and 1 part by weight potassium chloride per 100 parts by weight water.

Samples A' and E' correspond to Samples A through E except that Samples A' and E' additionally contain 5 parts by volume methanol per 100 parts by volume of water.

TABLE II

| Sample | Viscosity (cp) | | | | | | |
|---|---|---|---|---|---|---|---|
| | 100°F | 150°F | 200°F | 250°F | 300°F | 350°F | 400°F |
| A | 325 | 220 | 163 | 119 | 75 | 38 | 0 |
| B | 88 | 77 | 76 | 69 | 60 | 35 | 15 |
| C | 80 | 107 | 150 | 146 | 87 | 24 | 2 |
| D | 100 | 64 | 126 | 111 | 60 | 13 | 0 |

This series of tests illustrate the low initial viscosity of a fracturing fluid containing a crosslinked polysaccharide

TABLE III

| Sample | Viscosity (cp) | | | | | | |
|---|---|---|---|---|---|---|---|
| | 0 hr. | ½ hr. | 1 hr. | 1½ hrs. | 2 hrs. | 2½ hrs. | 3 hrs. |
| A | 54 | 29 | 22 | 18 | 16 | 13 | 11 |
| B | 30 | 22 | 18 | 15 | 13 | 11 | 10 |
| C | 55 | 33 | 18 | 10 | 7 | 3 | 1 |
| D | 12.5 | 13 | 10 | 8 | 7.5 | 7 | 6 |
| E | 32.5 | 23 | 21 | 19 | 18 | 17 | 16 |

TABLE IV

| Sample | Viscosity (cp) | | | | | | |
|---|---|---|---|---|---|---|---|
| | 0 hr. | ½ hr. | 1 hr. | 1½ hrs. | 2 hrs. | 2½ hrs. | 3 hrs. |
| A' | 65 | 60 | 53 | 48 | 44 | 41 | 36 |
| B' | 46 | 40 | 37 | 34 | 33 | 33 | 32.5 |
| C' | 51 | 41 | 34 | 31 | 27.5 | 25 | 23 |
| D' | 14 | 24 | 28 | 25 | 22 | 18 | 16 |
| E' | 37.5 | 34 | 32.5 | 32.5 | 32 | 32 | 31 |

Tables III and IV illustrate the temperature stability of various polysaccharides and the effect of alcohol on reducing the thermal degradation of polysaccharides.

EXAMPLE IV

The comparative ability of two weak acids to control the hydration rate of crosslinked hydroxyethylcellulose is determined by first homogeneously mixing the indicated components with water, heating the resulting fluid to 140°F in a Fann Model 50 Viscometer and maintaining the fluid at 140°F for the time indicated on Table V before taking the 300 RPM dial reading, using a No. 1 spring and sleeve. This reading is reported on Table V as the apparent viscosity in centipoise (cp).

Sample A contains 30 pounds of hydroxyethylcellulose, 60 pounds of crosslinked hydroxyethylcellulose, 20 pounds of sodium dihydrogen phosphate and 20 pounds of paraffin coated borax per 1,000 gallons of water.

Sample B contains 30 pounds of hydroxyethylcellulose, 60 pounds of crosslinked hydroxyethylcellulose, 15 pounds of a blend of 70 parts by weight fumaric acid and 30 parts by weight sodium carbonate per 100 parts by weight of the blend, and 25 pounds of paraffin coated borax per 1,000 gallons of water.

TABLE V

| Sample | Viscosity (cp) Time (minutes) | | | | | | | | |
|---|---|---|---|---|---|---|---|---|---|
| | 1 | 2 | 3 | 4 | 6 | 8 | 10 | 12 | 14 | 16 |
| A | 30 | 120 | 155 | 172 | | | | | | |
| B | 10 | 16 | 19 | 20 | 27 | 38 | 75 | 133 | 153 | 161 |

This data indicates that a blend of fumaric acid and sodium carbonate is more efficient than sodium dihydrogen phosphate at delaying the hydration time of crosslinked hydroxyethylcellulose.

EXAMPLE V

The temperature stability of three viscous fracturing fluids is determined by first homogeneously mixing the indicated components with water, heating the resulting fluid to 250°F in a Fann Model 50 Viscometer and maintaining the fluid at 250°F for the time indicated on Table VI before taking the 300 RPM dial reading, using a No. 1 spring and sleeve. This reading is reported on Table VI as the apparent viscosity of the fracturing fluid in centipoise (cp).

Sample A contains 120 pounds hydroxyethylcellulose per 1,000 gallons of water, 1 part by weight potassium chloride per 100 parts by weight water, and 5 parts by volume isopropyl alcohol per 100 parts by volume water.

Sample B contains 100 pounds hydroxyethylcellulose per 1,000 gallons of water, 1 part by weight potassium chloride per 100 parts by weight water, and 5 parts by volume isopropyl alcohol per 100 parts by volume water.

Sample C contains 120 pounds hydroxyethylcellulose per 1,000 gallons of water and 1 part by weight potassium chloride per 100 parts by weight water.

TABLE VI

| Sample | Viscosity (cp) | | | | | | |
|---|---|---|---|---|---|---|---|
| | 0.5 hr. | 1.5 hrs. | 2.0 hrs. | 3.0 hrs. | 4.0 hrs. | 5.0 hrs. | 6.0 hrs. |
| A | 111.5 | 107.5 | 104.5 | 100 | 97.5 | 94.5 | 93.5 |
| B | 75 | 71.5 | 68.5 | 64 | 62 | 61 | 61 |
| C | 88 | 71.5 | 60 | 46.5 | 37.5 | 31 | 26.5 |

A comparison of the viscosity of Sample C to Sample A or B indicates that isopropyl alcohol reduces the degrading effect of temperature on hydrated hydroxyethylcellulose.

It will be apparent that many widely different embodiments of this invention may be made without departing from the spirit and scope thereof, and therefore it is not intended to be limited except as indicated in the appended claims.

What is claimed is:

1. An aqueous fluid having a pH of less than about 7 and having improved resistance to viscosity degradation at temperatures of up to about 400°F, said fluid consisting essentially of:
   water,
   a retarded gelling agent present in said fluid in the range of from about 10 to about 300 pounds per 1,000 gallons of said water, and
   a base present in said fluid in the range of from about 5 to about 50 pounds per 1,000 gallons of said water; wherein
   said retarded gelling agent is the product of the reaction of between about 0.05 to about 100 parts by weight of a hereinafter described compound and about 100 parts by weight of a hydratable polysaccharide having a molecular weight of at least about 100,000 selected from the group consisting of gums, cellulose ethers and mixtures thereof, said compound being selected from the group consisting of 2-hydroxyadipaldehyde, dimethylol urea, water soluble urea formaldehyde resins, water soluble melamine formaldehyde resins, dialdehydes having the general formula:

$$OHC\ (CH_2)_x\ CHO,$$

wherein $x$ is an integer having a value in the range of 0 to about 3, and mixtures thereof; and said base is any water soluble chemical having a pH greater than 7 which is encapsulated in a material selected from the group consisting of waxes, hydratable methylcellulose, and mixtures thereof which is insoluble in said aqueous fluid and which has a melting point in the range of about 150° to about 300°F.

2. The aqueous fluid of claim 1 further consisting of an alcohol having the general formula:

$$C_nH_{(2n+1)}OH,$$

wherein $n$ is an integer within the range of 1 to about 5 and mixtures thereof, wherein the concentration of said alcohol in said fluid is in the range of about 1 to 10 parts by volume alcohol per 100 parts by volume of said water.

3. The aqueous fluid of claim 2 further consisting of a gelling agent selected from the group consisting of a hydratable polysaccharide having a molecular weight of at least about 100,000; a hydratable polyacrylamide having a molecular weight of at least about 30,000 and mixtures thereof.

4. The aqueous fluid of claim 3 wherein said hydratable polysaccharide utilized in said retarded gelling agent is selected from the group consisting of galactomannan gums, glucomannan gums, cellulose ethers, and mixtures thereof, said cellulose ethers being selected from the group consisting of hydroxyethyl cellulose, carboxymethylcellulose, and carboxymethylhydroxyethylcellulose.

5. The aqueous fluid of claim 4 wherein said gelling agent in one of said hydratable polysaccharides.

6. The aqueous fluid of claim 5 wherein said retarded gelling agent is the reaction product of said polysaccharide and said dialdehyde.

7. The aqueous fluid of claim 6 wherein said polysaccharide is one of said cellulose ethers.

8. The aqueous fluid of claim 7 wherein said cellulose ether is hydroxyethylcellulose having an ethylene oxide substitution within the range of about 1 to about 10 moles of ethylene oxide per anhydroglucose unit.

9. The aqueous fluid of claim 8 wherein said pH is within the range of about 3 to about 4.

10. The aqueous fluid of claim 9 wherein said encapsulating material is selected from the group consisting of hydratable methylcellulose, paraffin and mixtures thereof.

11. The aqueous fluid of claim 10 wherein said base is selected from sodium bicarbonate and borax.

12. The aqueous fluid of claim 11 wherein said dialdehyde is selected from one of glyoxal and glutardialdehyde.

13. The aqueous fluid of claim 12 wherein said hydroxyethylcellulose has an ethylene oxide substitution within the range of about 1.3 to about 3 moles of ethylene oxide per anhydroglucose unit.

14. The aqueous fluid of claim 13 wherein the "$n$" value of said alcohol is in the range of 1 to about 3.

15. The aqueous fluid of claim 14 wherein said gelling agent is hydroxyethylcellulose having an ethylene oxide substitution within the range of about 1.3 to about 3 moles of ethylene oxide per anhydrogluclose unit.

* * * * *